(12) United States Patent
Jing et al.

(10) Patent No.: US 8,131,118 B1
(45) Date of Patent: Mar. 6, 2012

(54) INFERRING LOCATIONS FROM AN IMAGE

(75) Inventors: Yushi Jing, Mountain View, CA (US); Jian Yuan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1039 days.

(21) Appl. No.: 12/023,763

(22) Filed: Jan. 31, 2008

(51) Int. Cl.
*G06K 9/54* (2006.01)
*G01C 21/00* (2006.01)

(52) U.S. Cl. .................. 382/305; 701/200; 701/207

(58) Field of Classification Search ............... 382/100, 382/217, 218, 305; 709/207, 204, 223; 348/113, 348/116; 455/456.1, 457; 701/200, 207, 701/208
See application file for complete search history.

(56) References Cited

U.S. PATENT DOCUMENTS

| | | | | |
|---|---|---|---|---|
| 2008/0064438 | A1* | 3/2008 | Calvet et al. | 455/556.1 |
| 2008/0133526 | A1* | 6/2008 | Haitani et al. | 707/7 |
| 2009/0196510 | A1* | 8/2009 | Gokturk et al. | 382/224 |

OTHER PUBLICATIONS

Szeliski et al., "ICCV 2005 Computer Vision Contest" [online]. Microsoft, 2004, 6 pages. Retrieved from the Internet: <URL: http:research.microsoft.com/en-us/um/people/szeliski/VisionContest05/old_ideas.htm.

Luo et al., "Geotagging in multimedia and computer vision—a survey." Springer Science+Business Media, LLC, Oct. 2010. Multimed Tools Appl (2011) 51:187-211, 25 pages.

Wei Zhang and Jana Kosecka, "Image Based Localization in Urban Environments." Department of Computer Science, George Mason University. International Symposium on 3D Data Processing, Visualization and Transmission, 2006 (oral presentation), 8 pages.

* cited by examiner

*Primary Examiner* — Yon Couso
(74) *Attorney, Agent, or Firm* — Fish & Richardson P.C.

(57) ABSTRACT

Systems and methods are disclosed for determining the location where an image was captured. In general, a device such as a smartphone may capture one or more images from a location, such as images of buildings, street signs and the like, and a central system may compare the submitted images to images in an image library to identify matches. The location of the match may then be provided back to the smartphone.

20 Claims, 6 Drawing Sheets

INFERRING LOCATIONS FROM AN IMAGE

TECHNICAL FIELD

This disclosure relates to image matching, and more particularly to image matching to infer a location.

BACKGROUND

Being "lost" can be an unpleasant situation that most people try to avoid. The anxiety that arises out of being lost, especially if a person is on a schedule, or is late for an appointment, can be overwhelming and frustrating. In some situations, becoming lost in a "rough" neighborhood can be downright dangerous. To reduce the possibility of becoming lost, people can use paper or electronic maps to help guide their way.

Some people have difficulty reading maps, however, which can add to the frustration of being lost in the first place. Electronic guides (including GPS-based navigation systems) can be useful when a person knows the general area, but consider a situation when a traveler gets lost in a foreign country, where street signs are displayed in a language other than the traveler's native tongue—electronic guides may not be able to provide adequate assistance in such a case.

The position of stars in the night sky can provide direction for skilled navigators. Before the advent of street names and electronic guidance systems, terrestrial navigation and positioning could be performed by reference to landmarks, including terrestrial objects (mountains, rivers, etc.) and man-made objects (cities, lighthouses, for example). This method, while seemingly antiquated in light of technological advances, may still provide navigational utility.

SUMMARY

Systems and methods are disclosed for determining the location where an image was captured. In general, a device such as a smartphone may capture one or more images from a location, such as images of buildings, street signs and the like, and a central system may compared the submitted images to images in an image library to identify matches. The images in the image library may have tags associated with them, including location-related tags. For example, the images may have JPEG meta data stored with them that provide a geo-location from when the image was acquired. The images may also have been obtained by crawling web pages, where the web pages may have listed address information along with the images (e.g., where a company shows a photo of its office building on a page that gives the building's address). Such location-related information may then be used to inform a user of the device where they are located (or at least where the things in the image are located). Such an approach may be used to provide location information for images in other circumstances also, such as when a person surfing a photo-sharing site sees a photo and submits it to determine where the photo was taken.

In one implementation, a computer-implemented location identification method is provided. The method includes receiving an image from a remote electronic device and comparing information from the image with corresponding information from a plurality of stored images to determine location information to associate with the received image. The stored images are associated with image-related location information and information identifying a location for the received image based on the comparison is transmitted to the remote device. One or more embodiments of the method provide that the compared information from the images includes information from feature points in the images.

In certain embodiments of the computer-implemented method, the method further includes obtaining the stored images by crawling publicly available web pages that include images and location-related textual information.

In certain embodiments of the computer-implemented method, the method can further include the following:
1) saving the received image and location information for the received image with the stored images;
2) recognizing text in the image and comparing the text to location information to determine a location for the received image;
3) transmitting a prompt requesting a user to submit information on a name of a roadway or other textual geographic description, and using resulting supplied information to identify location-related information for the received image;
4) transmitting to the remote device a plurality of photos corresponding to the location for the received image;
5) transmitting to the remote device data for displaying a map with the location for the received image marked on the map;
6) receiving a series of images in a video and comparing a plurality of images in the series to stored images to determine a geographic location corresponding to the received images;
7) generating a match quality indicator for a match between the received image and a stored image, and assigning location information from the stored image to the received image if the quality indicator exceeds a determined level; and
8) using information about the remote device location from a source other than the remote device to determine the location for the received image.

In one implementation, a computer-implemented location identification method is provided. The computer-implemented method includes submitting to a remote server an electronic image of a geographically-located object, and receiving, in response to the submission, information disclosing the geographic location of the object. The computer implemented method further includes wherein the information disclosing the geographic location of the object is generated by comparing the electronic image to one or more stored images and using location-related information for a stored image that matches the submitted image.

In certain embodiments of the computer-implemented method, the method can further include submitting to the remote server an image of a geographical textual landmark. The information disclosing the geographic location of the object can include data for generating a map surrounding the geographic location, and can include receiving a plurality of images of landmarks near the geographic location. In some embodiments the method can further include receiving business information corresponding to the geographic location or businesses in proximity to the geographic location.

In one embodiment, a computer-implemented location-finding system is provided. The computer-implemented system includes an interface to receive messages containing images of geographically-associated items, an image database storing a large plurality of images having geographically-related data representing locations for the stored images, and an image comparator to identify locations for the received images by comparing the received images to the stored images and assigning, to the received images, location information from stored images that match the received images.

In some implementations of the system, the system can further include: a local search engine module to automatically return local search results for the identified geographic locations; the system can also include an information repository that stores business information pertaining to the geographically-associated items.

In one embodiment, a computer-implemented location-finding system is provided. The system includes an interface to receive messages containing images of geographically-associated items, an image database storing a large plurality of images having geographically-related data representing locations for the stored images, and means for assigning location information associated with the stored images to the received images.

These and other implementations may have one or more of the following advantages. A user can be ascertain their whereabouts through very little effort on the part of the user, and without use of navigational aids, such as a map. For example, a person with little or no knowledge of his or her surroundings can take a photograph of a building or other subject, upload the image to a processor, and receive information back regarding the user's location. Image subject matching, e.g., matching a building or landscape, to a location can be performed on a remote server. An advantage for the user is that the image matching analysis and location determination is done for them, without any direct intervention or input by the user, other than simply uploading the photograph to the server.

In some cases, an advantage is that a person who has become lost can have their location identified for them through a user-friendly, simple, and inexpensive interface. In some cases, the interface exists on a mobile device, such as a cellular phone or PDA; many people carry cellular phones or PDA's with them, more so than maps, usually.

A further advantage is that location information can be provided in locations where the user has difficulty communicating, for example, by speech or written word. An example is when a user travels to a foreign country and has trouble understanding the native tongue or reading their directional signs. In these cases, a user can upload a photograph of an object, and, in some cases, an indication of where they are trying to go, and receive information back—in their native language—that aids them in their quest.

In some cases, a user may receive targeted information, such as advertisements, coupons, scheduled events, and the like that relates to their location, once it has been inferred by the system that calculates a match to their image subject. In this case, a user's location is identified for them and they can receive additional information that can save them money or advise them of events they may enjoy.

In some cases, an advantage can include providing security or awareness of adverse events near the user. For example, certain countries in the world are known to experience outbreaks of violence stemming from political unrest. A user may be informed of a riot or other unruly event when the system calculates their location and correlates current events captured from a news source.

Similarly, a user may be informed that they are approaching a border to an adjoining country which they may want to avoid, for whatever reason, if their position has been inferred as being close to that border.

In some cases, multiple entities gain advantages from the use of the techniques and methods described herein. For example, the user gains an awareness of their currently location if they become lost or disoriented. Third-party advertisers, for example, restaurants, may gain business if one of their coupons is served to the user as a result of a location query. A service provider, such as Google, who hosts the service on a server, may gain additional subscribers or users who use their services, allowing them to serve more targeted advertisements, and increase their revenue.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This section describes systems and techniques by which a user can discern the location shown in a digital image. A user may want such information in a variety of circumstances. For example, if the user is lost, they may take pictures with their cellular telephone and submit them for analysis, to find out where they are. Their location may then be returned to them on a map—perhaps with photos taken by other people in the same location so that they can verify that the determination of their location was accurate. Also, users surfing the web may want to learn the location at which an image was taken. For example, they may see a beautiful piece of architecture and may want to plan a vacation to visit the building shown in a photo. Also, they may want to find other images from the same location as an initial image, so that they can make a collage of the images in that area.

The determination of an image's location may generally be made by comparing features from the image with features from a library of pre-stored images. The pre-stored images may include location-related meta data. For example, the images may have come from cameras that provide geo-location data in the JPEG, GIF, or other file format. The images may also have been extracted from web pages that include geographic information. For example, if the picture of an office building is adjacent to an address on a web page, a system may infer that the address is the address of the building. The location-related meta data may then be used to assign a location to the submitted image. With such information, a system can take various steps, such as notifying the user of the image's location, presenting other images from the same location, and presenting ads targeted to the location, among other things.

Figure 1:
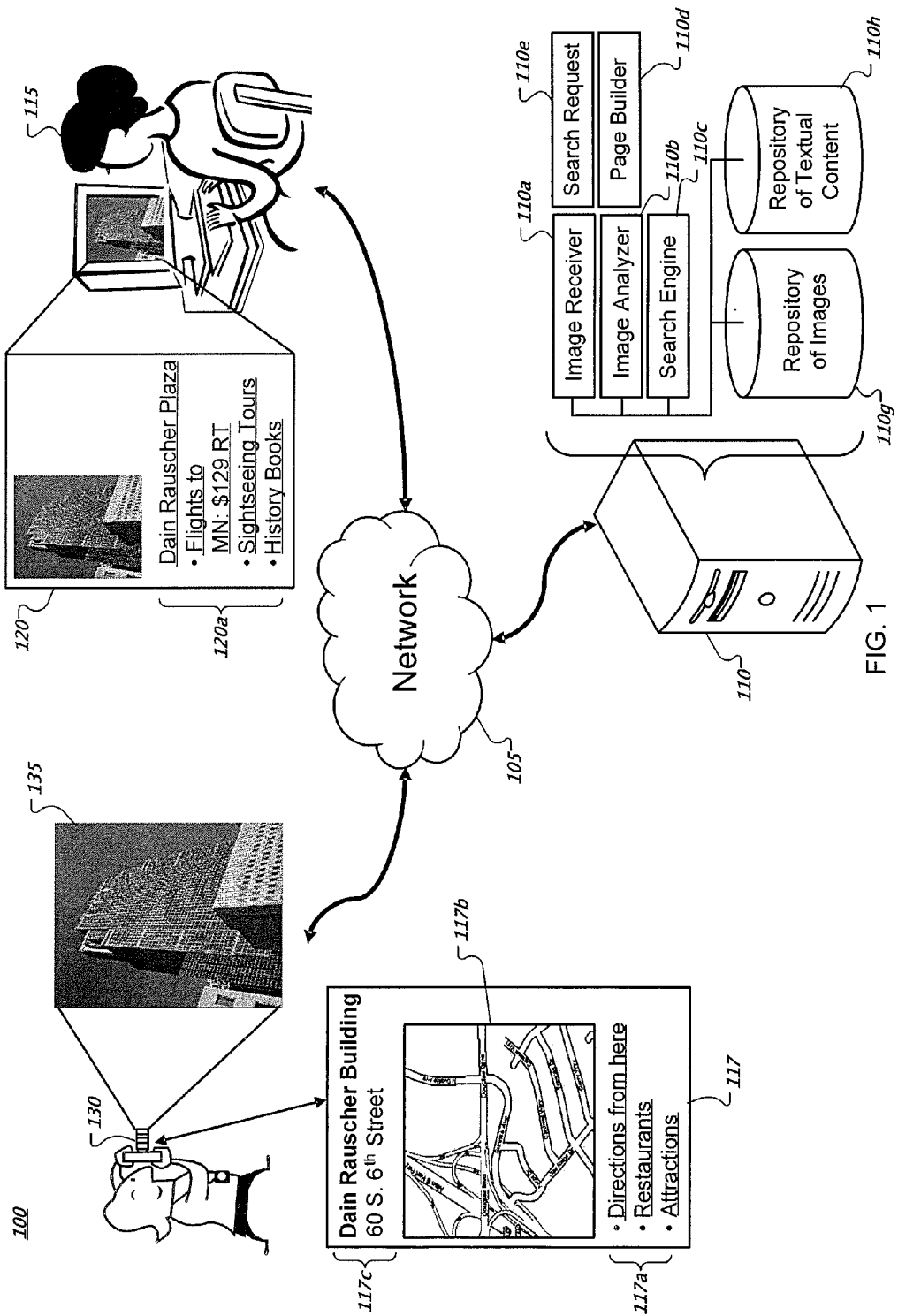
FIG. 1 is a conceptual diagram showing the identification of an object location from a digital image.

FIG. 1 is a conceptual diagram showing the identification of an object location from a digital image. The identification may occur using a system 100 that includes components for capturing images, comparing that to a repository of known images, and making a determination of location for the first image based on the closeness of match with the stored images, and with meta data associated with the stored images.

An image can be a reproduction of an actual object, such as a photograph of a subject captured by a camera. A recording device 130 can capture images, e.g., image 135 and subsequently transmit them to a computing system 110 via a computer network 105, such as the internet. The computing system 110 can infer the identity and/or location of the imaged subject 135 by methods described in detail below, as well as others, and may subsequently determine information about the subject. In one embodiment, the location of the subject is inferred by matching the subject to a second image that may include the same subject, and where the second image contains associated information about the physical location of the subject. The information retrieved about the image subject 135 can be transmitted to a remote computing device, such as a cell phone or a personal digital assistant (PDA) that submitted the original image. The image transmitted to the computing system 110 can itself be geo-tagged and stored, along with information gathered relating to the image subject, and made available to users 115.

Imaging device 130 can include electronic devices that capture images. For example, a mobile imaging device may be a camera, such as a digital camera, or a digital movie camera. Cameras can be stand-alone devices or can be part of integrated devices such as cellular telephones, smartphones, PDA's, "webcams," and the like. Also included are devices that can transform a photograph printed or developed on photographic paper to digital format, such as an optical scanner. In some embodiments, individual frames from a sequence of frames (such as a movie) can be extracted from the sequence to provide a single, transmittable image, as described more fully below.

Some imaging devices 130 can include functionality for users to add personalized content to their captured images. For example, some digital cameras include the ability to associate a voice recording with a certain photograph, allowing the user to dictate personal notes about the captured image. Other imaging devices 130 allow a user to enter textual content and associate it with a particular image; textual content can include, for example, the date, time, and other information, including, for example, the location that the image was captured. Yet other digital cameras may store geo-tagging information, such as in EXIF headers of digital image files.

Digital images can be stored in a format that allows both binary information (e.g., information about the picture itself, such as pixel information), as well as textual information (although textual information can also be in binary format) to be saved. A file name of the image can also include useful textual information, since the choice of file name is often times left to the user of the imaging device 130. For example, a user may name a series of photographs "grand_canyon1.jpg," "grand_canyon_2.jpg," . . . etc.

Computing system 110 includes computing modules and repositories that can perform functions relating to receiving and cataloging images, analyzing and identifying the images, searching for information pertaining to the image, and constructing content, such as web pages, to be displayed to users, among other functions. Computing system 110 may also include data libraries or repositories that store information, such as a repository of geo-tagged images 110g and a repository of textual content 110h that may have content associated with individual geo-tagged images.

In one embodiment, image receiver 110a can receive images transmitted to the computing system 110 and may be part of a user interface that allows uploading of photographs to a server, for example. Image receiver 110a may provide interactive queries and responses to a user that aids in transmitting the user's images to the computing system 110, such as providing web-based interface displays that allow a user to search their hard drive or storage devices (including, e.g., digital cameras) for the images. Users may enter information pertaining to images or a group of images to which the image receiver 110a can append, or use to classify the image files; for example, a user may wish to title a series of images "White-water rafting on the Salmon River."

In one embodiment, image analyzer 110b can perform the computational functions related to analyzing an image to infer an image subject, and is described more fully below. Image analyzer 110b can interrogate an image to deduce, for example, that an image subject is a particular building in a particular city. In some embodiments, the deduction is accomplished via image comparison to known images that may be stored, for example, in a repository of images 110g, e.g., a database of geo-tagged images. In other embodiments, the subject of the image may be identified by other means as described below.

In one embodiment, after at least one element of a submitted image has been identified, such as a landmark, or city building, for example, information about that element is searched for by a search engine 110c. Search engine 110c can query an index of textual content 110h that may be physically located within computing system 110. Alternatively, the search can be performed across a network of computers 105.

As an example of the type of functionality search engine 110c may provide, consider a case in which image analyzer 110b has determined that an image subject is the Dain Rauscher building in downtown Minneapolis, Minn., as depicted in FIG. 1. With this information, search engine 110c may seek out information related to the Dain Rauscher building, and find, for example, its location on a map, its history, and other related information; it also may find commerce-related information, such as nearby businesses, sight-seeing, books about skyscrapers, etc. If it determines that the user submitting the image is from an area far from the area in the submitted image, it may provide promotional travel ads (if the submission is of a previously captured image, such as by being submitted from a desktop computer) or may provide promotional local ads such as restaurant ads and local movie listings (if the submission is from a mobile device, from which the system can infer that the image was just captured using a camera integrated with the device). The image, and the associated information retrieved by the search engine 110c, may be stored together in the repository of images 110g, or a link between the image and associated information stored in the repository of textual information 110h can be created.

In one embodiment, a page builder 110d can receive results of the search engine query, such as the location and commerce-related information just described. Page builder 110d can take such information, along with the image, and construct content pages that present the elements together, as shown in FIG. 1, content pages 117 and 120, which can include images and related information, 117a and 120a, respectively. In some embodiments, the related information can be sent back to the imaging device 130 that submitted the image 135 to the computing system 110. Exemplary content page 117 includes a map 117b of the area where the subject of the image 135 (the Dain Rauscher building) exists, along with address information 117c corresponding to same. Exemplary content page 117 further includes interactive links 117a that a user can select, for example, to receive directions to or from the inferred location, information on nearby restaurants, attractions, and other types of information. Page builder 110d may further provide, for example, targeted advertising from third-party vendors, links to websites with similar content, or links to other on-line repositories that store similar images.

In one embodiment, the system 100 operates as follows. An image 135 is captured of a subject by a user using an imaging device 130. That image 135 is uploaded to a computing system 110, for example, via a web interface or an integrated application, such as GOOGLE PICASA, through a computer network 105. The uploading may occur automatically also, upon the user taking a picture and then selecting a control in an application for causing the analysis of images. The image 135 is received by the image receiver 110a and analyzed by the image analyzer 110b, which infers the subject of the image 135. If the image 135 subject matches a subject of a geo-tagged image located, for example, in the repository of images 110g, the known location of the subject can be transmitted back to the imaging device 130. (The literal subject of the image may not be known, but match between the two images inferentially identifies the subject.)

Furthermore, based on that determination, information about the subject or the location of the subject is retrieved by the search engine 110c and appended, or linked to the image 135. Meta data associated with stored images may then be applied to the submitted image, and may be stored as part of the repository of images 110g.

Figure 2:
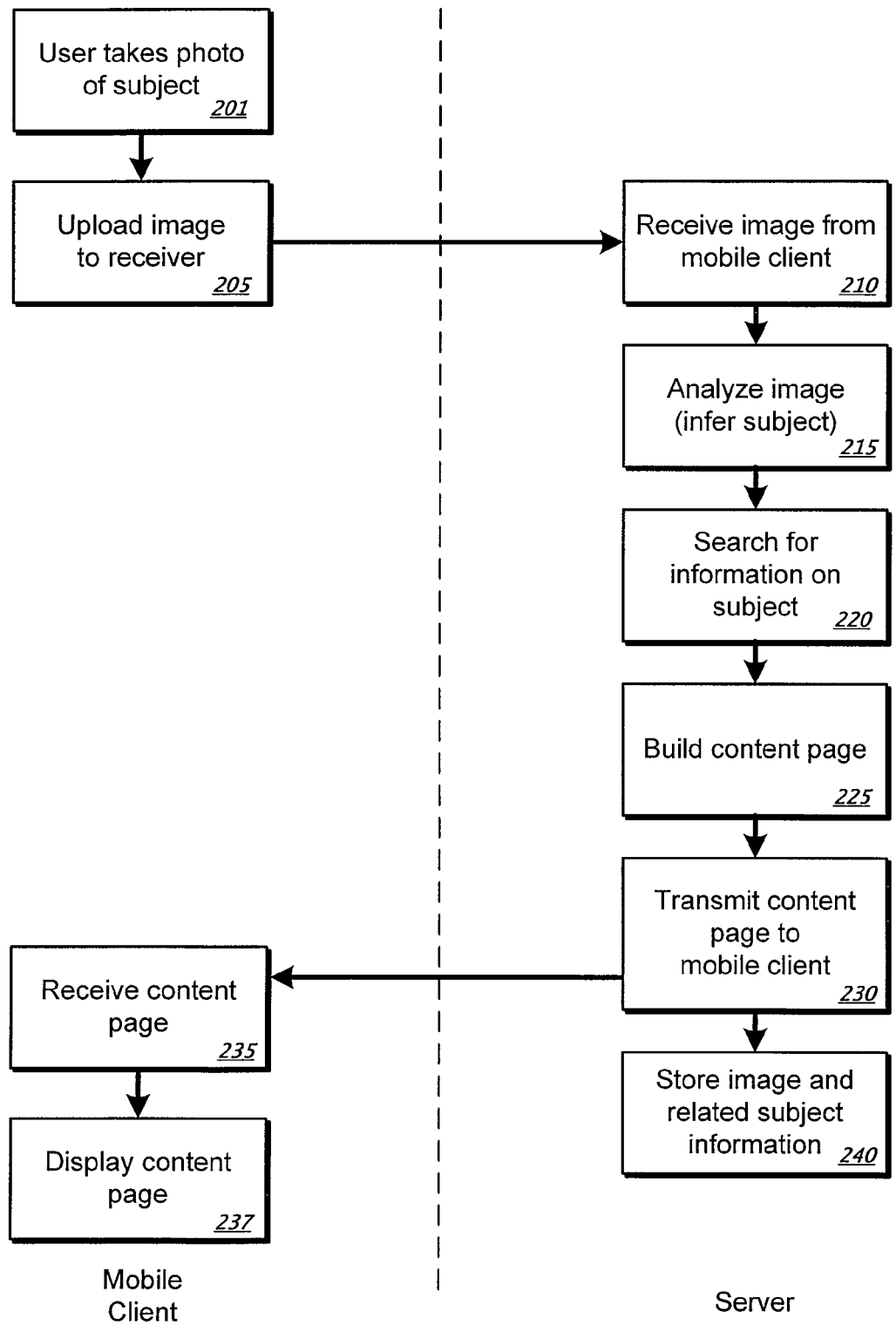
FIG. 2 is a flow chart of a process for providing a client device with location information of an image submitted by the client device.

FIG. 2 is a flow chart of a process 200 for providing a client device with location information of an image submitted by the client device. The actions shown in the process 200 generally exhibit interactions between a mobile device and a central server that processes images submitted by the device. The actions are explained in the context of the following example.

An exemplary situation where a system may provide utility is where a person is in a city they have never been in, or is in an unfamiliar area, for example, an American tourist visiting Japan. Consider that the tourist has become lost in Tokyo and wishes to know their current location. In a city where English is not the native language, simply asking a passer-by for help is not necessarily a dependable convenience. Beginning at step 201, the lost tourist can take a photograph of a building or prominent structure, and send this image to a server, step 205, for example via MMS, e-mail, FTP, or a web interface. In some embodiments, a web interface may have an option allowing the user to indicate that they are lost and wish to know their current location. Alternatively, the user may simply access an application that is dedicated to finding location information from images, so that any submission through that application will be presumed to be requesting location information.

At step 210, the server receives the image, for example, through the image receiver module 110a previously explained. The image may be received as part of an MMS message or other communication, and may be extracted form such communication. The image is then analyzed, step 215, to infer the subject of the image, for example, through the use of the image analyzer 110b.

In some embodiments, a repository of images may exist and be accessible by the server that comprise images of objects that have been geo-tagged or otherwise identified with respect to their location, for example using global positioning satellite (GPS) data. The repository may include images of buildings, landscapes, streets, mountains, rivers, architectural attractions, large gathering areas (such as sports arenas), tourist attractions, and the like, and may further contain data correlating their locations. The images within such repositories may be stored in an "original" state, or they may also be stored in edited form which aids the image analyzer 110b in identifying image subjects. For example, color, contrast, hue, resolution, etc., are all editable features of images that may be optimized for their use in comparing and identifying the subject(s) of user-provided images.

A server or other structure can identify objects in an image for matching a submitted image to stored images in various manners. For example, the server can identify feature points in the images, and calculate a level of difference across the feature points. The feature points may be areas in which data in the image changes suddenly (e.g., sudden shifts in pixel colors or brightness), such as where the object stops and the background behind the object begins. The feature points may together represent a sort of digital line drawing of the object in the image, in effect. Such comparisons are discussed in more detail below.

The stored images may have previously had their feature points determined by the system, so that such points are readily available for comparison. Such other images may have been obtained along with meta-data about the items, such as the manufacturer and model name for the items. For example, third-parties submitted images along with location data, a system may have crawled web pages from various vendors to extract such information from the unstructured web pages to turn it into structured data, or the images may have been geo-tagged such as in their EXIF headers. The feature points in the image acquired by the user may then be compared to the feature points in the previously stored images to find a closest match, and the meta data for the matching image may then be used to identify the item in the image from the user.

Once the subject of the image has been identified, such as by finding a stored matching image and accessing tags associated with the matching image, a search for information on the subject may be executed (step 220). However, in some cases, such as if the user simply needs to know where they are, step 220 may be bypassed and the location of the subject (and, by extension, the user) may be sent directly.

The search for subject information (step 220) may yield valuable information such as the nearest bus stop, tourist information center, train depot, hotels, and emergency services (such as a police or fire station, or hospital). In some embodiments, the type and amount of information retrieved may be set by the user in a "preferences" section of a user interface when uploading the images to the server.

The information obtained may depend on the context of the request. For example, if the request was made from a mobile device, local search results may be delivered to the device, under the assumption that the user is in the particular location. If instead, the submission was from a desktop computer, the results may be more targeted to someone having a general interest in the area, or someone seeking to visit the area in the future. Such responsive information may take a variety of forms, including targeting advertisements.

The information retrieved in step 220 may be used in building a content page, step 225. The content page (e.g., 117 in FIG. 1) can combine the image and related information into a format suitable for display on a remote device such as a cellular telephone display. The content may include interactive maps showing the user their current location (based on the location of the subject), along with links to other pages (such as web sites) that may relate to the user's location or the subject of the image itself. The maps may be annotated to show shops or other points of interest around the user.

At step 230, the content page can be transmitted to the device where the original query (i.e., the submission of the image) originated. For example, the tourist may snap a photo of the Nippon Budokan (a sports arena in Tokyo) and subsequently receive a content page containing the location of the nearest outlet for purchasing tickets to events there, or receive a link for purchasing tickets online.

In some embodiments, the identification of the device submitting the image for analysis is provided by unique attributes of the device, such as a cellular telephone number or serial number. In other embodiments, the user may access the system 100 through an online account, so that the server may identify the user.

At step 235, the content page is received by the mobile client and displayed to the user (step 237). In some embodiments, the information gathered in step 220 and the submitted image can be stored for future use, step 240. This step may reduce computing overhead, as frequently-submitted images by users may be accessed quickly along with pre-fetched information associated with the subject.

Particular techniques for matching a submitted image to one or more images in a repository are now described. In general, a database containing a set of geo-tagged images (or images that otherwise contain location information) is provided in a repository such as the repository of images 110g described in FIG. 1. These images can be images of subjects that have corresponding location identifiers, such as a latitude/longitude coordinate, street address, or GPS coordinate, for example.

For each image in the database, a collection of features corresponding to "interest points" can be generated. The interest points can be points where there is variation in a subject feature from surrounding features. For example, a photograph of a building against a blue sky background provides a contrast between the outline of the building and the sky, thereby defining an identifiable building shape. Interest points can be defined in a variety of ways mathematically, for example based on discontinuities or differences from the surrounding points. Examples of the types of features that can be computed can be found, for example, in Mikolajczyk, K., Schmid, C., "A performance evaluation of local descriptors," *IEEE Transactions on Pattern Analysis and Machine Intelligence,* 27(10), October, 2005, 1615-1630; and Lowe, D. G., "Distinctive image features from scale-invariant keypoints," *International Journal of Computer Vision,* 60(2), November, 2004, 91-110 (Springer Netherlands), which are each incorporated by reference hereby in their entirety.

For patch-based features, patches can be normalized to a canonical orientation, for example, by rotating a sub-image such that it is always brightest on top, or through various other schemes also described in the above references. Also, patches can be scale invariant or invariant to affine transformations.

Visual similarities can be used to identify the exact location of the subject of an image. In one approach, a similarity function can be defined for feature types; the comparison functions can range from simple to complex. Methods for comparing two images are known in the art; complex matching functions using geometric information to validate two sets of interest points can be found, for example in Lowe, D., "Local Feature view Clustering for 3D Object Recognition," *IEEE Computer Society Conference on Computer Vision and Pattern Recognition (CVPR '01),* Vol. 1, 2001, 682; Lowe, D., "Distinctive Image Features from Scale-Invariant Keypoints," *International Journal of Computer Vision,* 60(2), 2004, 91-110; Rothganger, F., Lazebnik, S., Schmid, C., Ponce, J., "3D Object Modeling and Recognition Using Local Affine-Invariant Image Descriptors and Multi-View Spatial Constraints," *IEEE Computer Society Conference on Computer Vision and Pattern Recognition (CVPR '03),* Vol. 2, 272-277, 2003; and Grauman, K., Darrell, T., "The Pyramid Match Kernel: Discriminative Classification with Sets of Image Features," *Tenth IEEE International Conference on Computer Vision,* Vol. 2, 1458-1465, 2005.

Where an repository contains a very large number of images, only a subset of the images may have image features computed for them, i.e., so that only geographically-indicative images are used. For example, images may be analyzed initially to determine whether they contain geographically-relevant features. For example, an image may be analyzed to determined whether it contains a horizontal line with blue or gray above it so as to indicate a horizon. Of the image may be analyzed for vertical and horizontal lines that meet at orthogonal angles, so as to indicate pieces of architecture. Images may also be analyzed for non-geographic content. For example, known face detection algorithms may determine if the image includes people and if those people were so close to the camera that they dominate the image and thus prevent a location from being discerned from it. Other transitory objects may also disqualify an image as being location-indicative, such as automobiles, and other such objects. Also, other forms may be discerned in an image such as still life objects, which would tend not to indicate a location. In this way, the computational overhead for a system may be lowered, and the quality of the data set in the system may be raised.

The subject(s) of images can be inferred by image analyzer module 110b by matching the subject with a similar subject from a database of images as described above and by other methods that will be apparent to skilled artisans of pattern/image recognition and matching. However, in some cases this deduction may prove difficult or computationally expensive when comparing an image over a large database of geo-tagged images, and supplementary information regarding the user's location may be useful to provide a "starting point" for the inference process. This supplementary information may be provided by querying the user for additional information regarding their whereabouts, or it may be collected "silently" i.e., without the user's knowledge or requiring user input.

In one embodiment, the system 100 may extract the user's general location by determining the cellular telephone tower that the call or data transmission originated from. In another embodiment, for cellular telephones equipped with GPS, the user's coordinates may be directly identified. In yet another embodiment, using known triangulation methods, a user's position can be determined using signal strength measurements from at least three cellular telephone transponders. Other methods can be used to measure a user's location from radio transmissions as will be evident to those skilled in the art. Also, an IP address associated with a user request may be used to produce an approximate location.

Alternatively, or in combination with the "silent" methods described above, a user can provide a "best guess" as to their location, which can be entered, for example, in a user interface associated with uploading an image for location analysis. This information may be in the form of a query posed and constructed by a remote server. For example, server 110 may prompt the user to see if they know their current city, state, zip code, or country. The server 110 may also prompt the user as to whether certain predominant landmarks are nearby when performing an analysis and narrowing choices of the user's location. For example, if the analysis of a submitted image deduces that the user is either in Chicago or Seattle, the user may be presented with a prompt such as "Do you see the Sears Tower?" and may provide a picture of the Sears Tower to the user for reference. The answer to this query may sufficiently resolve whether the user is currently in Chicago or not. Similarly, features unique to a particular city, state, or country, for example may be employed in the analysis process. Akin to the previous example, a prompt to deduce whether a user is in Quebec, Canada versus New York, N.Y., may be "Are the people in your area speaking a non-English language (French)?"

Alternatively, the user may initially submit multiple images or may be asked to submit multiple images. Such images may be of other objects (e.g. of two different office buildings on each side of the user) or of textual information such as store signs or street signs. Such information may be used to determine more accurately whether there is a match, such as by being used as a form of tie breaker where the initial image does not provide sufficient certainty. For example, if the first image provides a fair match for one building on Broadway in New York City (but the match would not be good enough under normal circumstances), and a second image provides a fair match to a nearby building, a process may be very confident that the match is accurate. Likewise, if the second image is of a street sign that, via OCR performed by a server, is determined to say "Broadway," the match can be inferred to be very good.

Figure 2A:
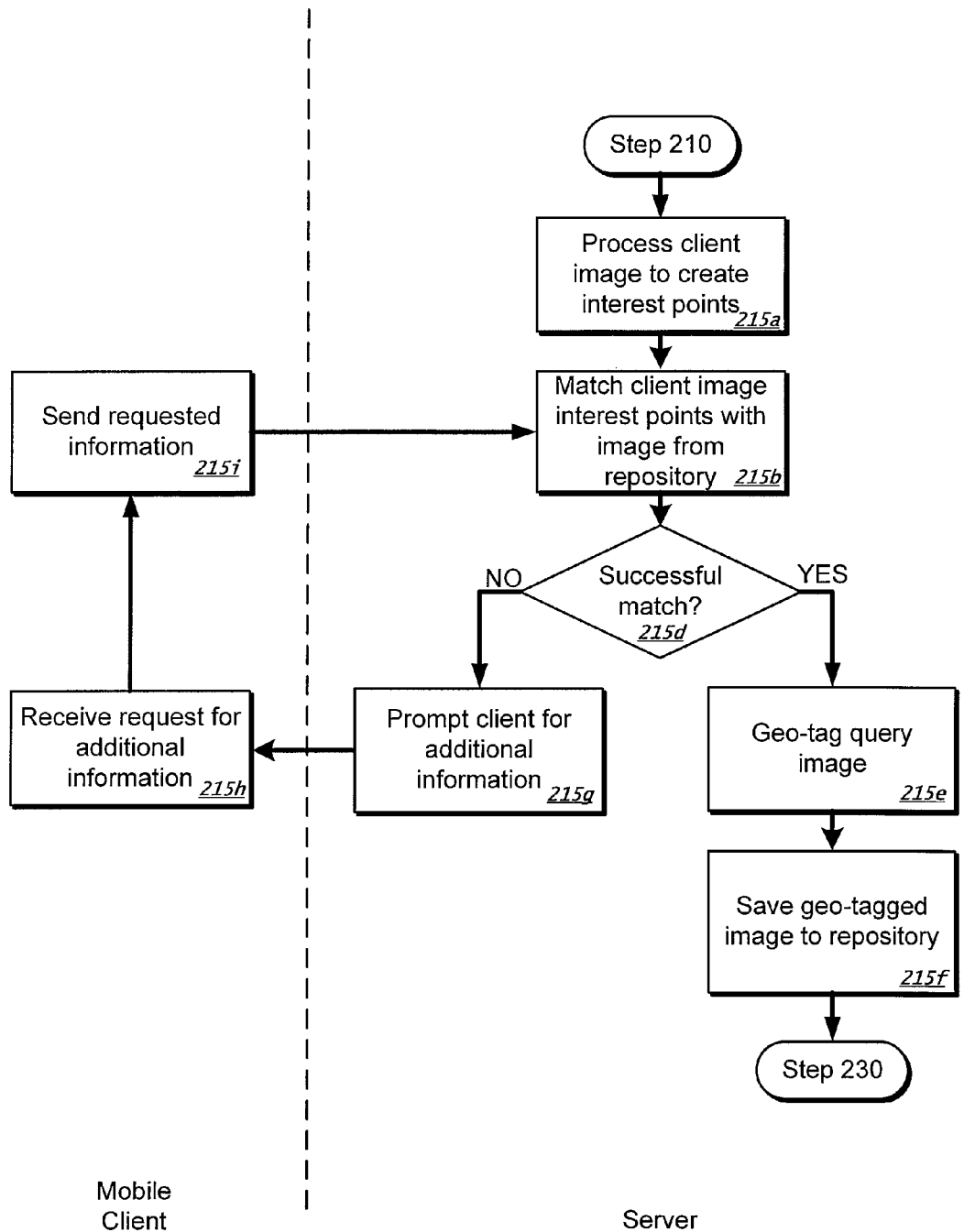
FIG. 2A is a flow chart of a process for identifying a location from a submitted image.

FIG. 2A is a flow chart of a process for identifying a location from a submitted image. In one example, the process here may be part of step 215 of the process shown in FIG. 2, and is described in that context here. At step 210 (FIG. 2), an image is received by the server. The image can be processed to create interest points, as described above and in the provided references (step 215*a*). At step 215*b*, the interest points of the submitted image can be compared to a pre-existing repository of geo-tagged images that may have been pre-processed to include interest points. As an initial search approach, the granularity of the search may be controlled so as to compare relatively macroscopic details of the image or interest points, thus narrowing the selection of an image match from the total number of images in the repository. For example, the periphery outline of a building may be examined first before focusing on the finer details of the structure, such as window shapes and sizes or perhaps a clock face that exists on the side of the building. Rough details versus fine details may be distinguished within interest points, such as by how abrupt a change in an image is (e.g., showing a hard change from one object to another or to a background) or how large the particular feature is (e.g., if it takes up most of the image, it will tend not to be a fine detail).

Comparisons may be made at increasing levels of specificity until a small result set is obtained, and particularly until one object is identified. Such an object or location may be identified, for example, by a very good match with a particular stored image, or by fairly good matches with several stored images (which presumably are images of the same object, but perhaps from different angles or under different lighting conditions).

If the initial search provides a suitable match (step 215*d*), then the location can be inferred and sent to the user (step 230, FIG. 2). The parameters that may define a "suitable" match may be controlled by various constraints applied to the mathematical outcome of the matching approach, some of which were described above. In some embodiments, it may be beneficial to geo-tag the user's image when a successful match has been made, step 215*e*. In this case, the user's image can be geo-tagged, step 215*e*, and added to the repository of geo-tagged images, step 215*f*. Geo-tagging a user's image may include adding location information to the image file along with the interest points that have been extracted from the image. This optional step may provide a way to build a large database of geo-tagged images. Good initial sources of geo-correlated figures are web pages that contain images and related location information, and photo sharing sites such as PICASA, which may host numerous geo-coded images.

If a successful match was not made, the user can be prompted for additional information to help narrow the search parameters, i.e., narrow the locations for which a search is executed, step 215*g*. A query to narrow the search space may include the "silent" queries described above, and others, and may also include queries comprising text and/or picture recognition, or submission of additional images. At step 215*h*, the user receives the alert and subsequently responds, step 215*i*.

The response, which may contain information that allows the server to narrow its search parameters for an image match from step 215*i*, is received by the server. With this new information, the search parameters for matching the user's image against the repository of geo-tagged images may be sufficiently narrowed to provide a positive match of the image subject's location. The search process begins again or is refined (e.g., by applying the new information to a subset of candidates identified from the initial submission of information) at step 215*b* using the results of the query, and can continue until the outcome at step 215*d* indicates a successful match and the path therefrom is subsequently followed.

The repository of geo-tagged images (e.g., 110*g* in FIG. 1) may be catalogued in a format that allows for efficient searching when attempting to match a user's image against the multitude of images in the database. For example, geo-tagged images can be catalogued according to the locations of the image subjects, and may be organized according to a hierarchical method, e.g., country→state→city→block. Alternatively, the images may be sorted hierarchically according to various manners in which features may be organized or expressed.

As noted above, in some embodiments, optical character recognition (OCR) techniques can be used to aid in the location inference process. For example, an image uploaded by a user may be interrogated for any resolvable characters by, for example, OCR methodologies that will be apparent to those skilled in the art of OCR. The image analyzer may be able to quickly discern that an image was taken in or near Los Angeles, Calif., if, for example, it recognized the word "Hollywood" somewhere in the image, such as from the Hollywood sign near Los Angeles. Likewise, street signs may be used to aid in location identification, as may buildings that advertise their name, or the names of their tenants, such as the CNN building in Atlanta, Ga., which boasts these three letters prominently.

In some embodiments, video may be uploaded by a user's client device, which, in essence, can comprise multiple "still" images that the system 100 can use to infer a location. In one example, a user may stand in one place and take a panoramic video (e.g., turn 360° in a circle). This video then could comprise images of multiple buildings, streets, signs, and other location-identifying elements that the image analyzer may use to infer a person's location accurately without the need for additional user queries. In these embodiments, an image receiver, e.g., image receiver 110*a* in FIG. 1, may parse the video into individual frames that are then sent to an image analyzer, e.g., image analyzer 110*b*, for analysis. Each frame, when analyzed, may result in a certain confidence level that the image subject is in a given location. If multiple analyzed images from the video produce the same inference for location, such may provide increased confidence for reporting the user's location, or can be used in a search narrowing process.

In some cases, the user's vantage point when taking a picture will not exactly match the perspective of the images in a repository of geo-tagged images. In these cases, the image analyzer may utilize multiple frames from an uploaded video to provide a better perspective of the image subject. For example, a user may capture a video of a building while walking from one side of the building to the next. The individual frames of the video, when analyzed, may provide a "wider" picture of the building and may aid in the process of image matching against geo-tagged images. For example, the first frame of the video may provide a vantage point of a building from the East, which may match certain portions of a geo-tagged image in a repository. However, this perspective may not conclusively identify a particular building, i.e., the match may not be ideal. Other frames in the video, e.g., the last frame, which may provide a vantage point from the West, may be used to determine to a further extent whether the building is indeed a match with the frame composed of an easterly perspective.

In another general aspect, a system can be used to provide directions using one or more geo-tagged images to guide a user to a chosen destination. This aspect can be particularly useful when a user is in a foreign country where, for example, street signs and other direction utilities are in a unfamiliar language. Generally, a user may be in a known or unknown location and request directions to a destination. The system may identify the user's location by methods described above, or, if the user knows their location, they may enter it directly; the user may also enter their chosen destination, which may also consist of uploading an image for location identification. The user's destination may also be determined automatically, such as by a hotel entry that the user's assistant has placed on their calendar.

The system can calculate a route for the user as commonly performed using online mapping and routing programs, such as GOOGLE MAPS. One or more locations that have been imaged previously and have been geo-tagged, for example a series of buildings along a city street, can be chosen along the calculated route. These locations, as presented to the user in images (e.g., from GOOGLE STREETVIEW) then can serve as waypoints to direct the user to their final destination. The images of the waypoints can be served to the user's mobile device consecutively, or one-by-one as the user reaches each waypoint and requests the next.

Figure 3:
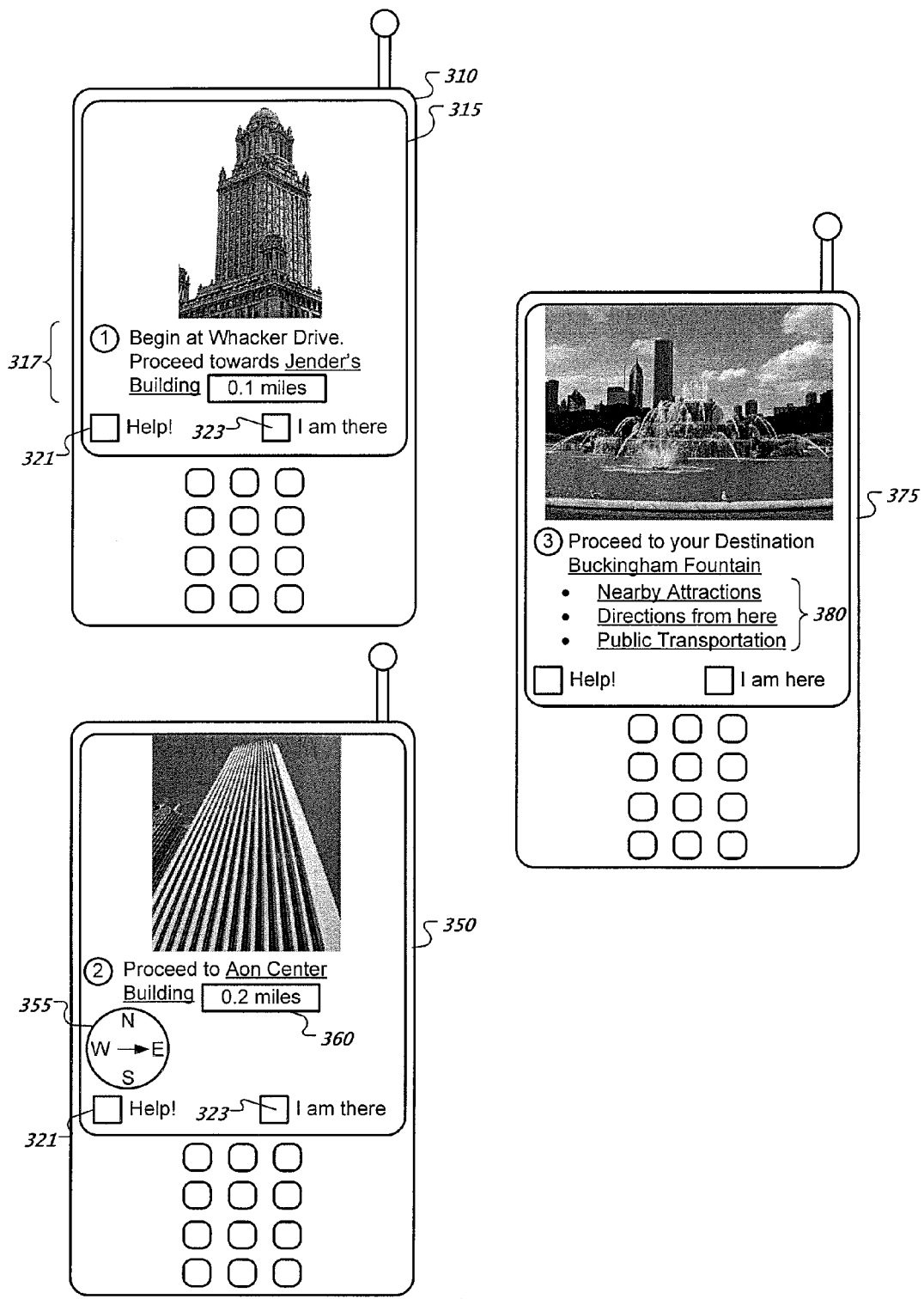
FIG. 3 shows mobile client displays providing directions to a user after the user has submitted an image.

FIG. 3 shows mobile client displays providing directions to a user after the user has submitted an image. Cellular telephone 310 shows a display 315 that may be served to the user after the user has requested directions to Buckingham Fountain in Chicago, from the general area of Whacker Drive in the same city. The display shows textual information 317 that may provide directions in written form—in this example, to begin moving toward the Jeweler's Building, and also displays an image 319 of the Jeweler's Building for the user's reference. Textual information 317 may contain links and other interactive content that may be of value to the user, for example, restaurants in the area of the displayed building. The display 315 may also contain areas where the user can send information to the server. For example, an interactive display may contain a button 321 that the user can click with a stylus to indicate that they need help (i.e., they have become lost). In this case, the server 110 may prompt the user to begin a process for determining their location as described above. Display 315 can also contains an area that, when selected, indicates to the server that the user has reached a waypoint. Such an area is indicated by box 323. Alternatively, the image of a building may be superimposed over a map, in a partially see-through window, so that the user can both navigate on a plan view of the local streets, but can also see images along the way.

Upon the server receiving an indication that a user has reached a particular waypoint, the server can send the next waypoint (display 350 of the same cellular phone 310) for display. In this case, the next waypoint is the Aon Center building. A digital compass 355 may be displayed to aid the user in starting toward the general area of the waypoint. In addition, the distance to the next waypoint can be displayed (text box 360). When the user reaches the Aon Center building, they may indicate so by pressing the "I am here button" as previously described. In this example, Buckingham Fountain may be in view from the Aon Center building; therefore the image of the final destination is shown in display 375.

Anticipating that the user may spend some time at their final destination, the server 110 may provide textual information 380 that could be beneficial to the user, such as nearby attractions, public transportation sites, links to information about their destination, and directions to other destinations, for example.

In some embodiments of this aspect, the number of waypoints is selectable. A user may decide how many images (waypoints) they wish to view en route to their destination. Additionally, the user may select the type of waypoint image to display. For example, undesirable consequences may result if a user is driving a car and looking out their window at the tops of buildings. In this case, selecting ground-based waypoint images (such as parks, statues, and the like) may be a wiser choice.

Figure 4:
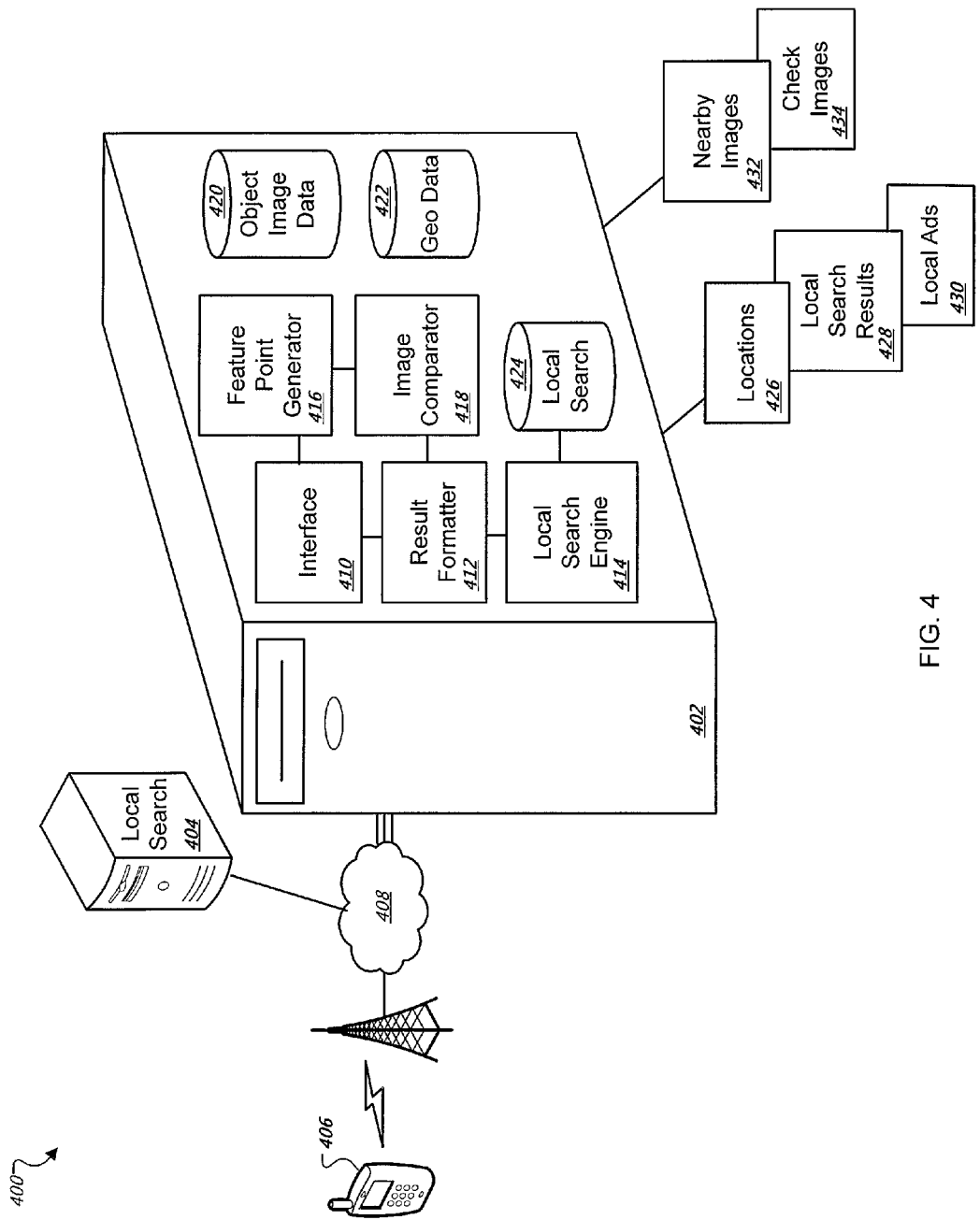
FIG. 4 is a schematic diagram of a system for identifying location information from submitted digital images.

FIG. 4 is a schematic diagram of a system 400 for identifying location information from submitted digital images. In general, the system may take a form like that of server 110 in FIG. 1 and may provide functionality for identifying a geographic location upon receiving an electronic image of an object at that location.

The system 400 generally centers around a geo-image server 402 that can receive images form various users such as from a wireless device 406 in the form of a smartphone or similar device. The geo-image server 402 infers a location that is reflected in the image, such as by the image comparison techniques described above, and returns location-related information back to the device 406.

Referring specifically to structural components of the geo-image server, an interface 410 receives and interprets requests from various devices. In particular, when an image is transmitted to the geo-image server 402 in an appropriate format, the interface 410 extracts the image from its associated request for analysis, and also extracts any parameter for the request.

The interface 410 may then pass the extracted image to the feature point generator 416, which may identify particular feature points in the image. The feature point generator 416 may also have previously identified feature points for a variety of other images, such as images in object image data database 420, and may have saved such information. The feature points for the submitted image may then be passed to the image comparator 418, which may in turn access image point data in the object image data database 420 and may compare the two in order to identify one or more images that match the submitted image to a sufficient degree.

When a match is found, the image comparator may access a geo data database 422 that stores location-related information associated with the various figures. In particular, the location-related data may include latitude and longitude data for each of the images in the object image data database 420, in one example. The image comparator may pass such location-related information to the result formatter 412 which may have received information from interface 410 informing it how data responses to the device 406 are to be formatted.

The result formatter 412 may, for example, use long-lat data to look up a human-readable address (e.g., 123 Main Street, Anytown, USA) and may pass the address back to the device 406 through the interface 410 (which may itself include one or more severs such as web servers).

Additional results may also be returned. For example, the results formatter 412 may pass location information to a local search engine 414, which may be part of a common system or a local search system 404 that may be a separate system. The local search engine 414 may be programmed to provide search results directed to a particular location such as the GOOGLE LOCAL SEARCH service. The local search engine 414 may obtain results from a local search database 424, which may have an index of information such as business names and addresses, points of interest, and the like.

The geo-image server 402 may output many different forms of information, and several example types are shown here, organized as textual information and image information. The textual information includes locations 426, such as human-readable addresses that match the location of an image submitted by the user. In addition, the information may include local search results 428, as discussed above, and local ads 430. The local ads may be selected in a familiar way, such as by adding a geographic location parameter to an GOOGLE ADWORDS search. Thus, when a user asks where they are by providing an image, they may be returned a map of the area that surrounds them, along with icons representing nearby businesses that have paid to have their advertising displayed with the results returned to the user.

Two example image results are shown here. The first is nearby images 432, which are images stored by the system 400 that have location-related information that is close to that of the image that was a match for the submitted image. As described above, such images may be used in assisting a user traveling between two points, by presenting the images as waypoints. Also, such images may be accompanied by other information, such as to show a user storefronts of restaurants in the area, or to include text describing the architectural significance of buildings in the area of the user. The images may also include "check" images 434, which may be actual copies of the stored images that the system 400 has preliminarily determined to be a match for an image submitted by a user. Where the confidence of such a match is low, however, the server 402 may send such images back to the user so that the user can confirm whether they truly are a match or not.

In some embodiments of the methods disclosed above, a computing system may infer that multiple images received within a given time period and from the same mobile imaging device are originating from the same general area. This inference can reduce the complexity involved in determining a general area for which the computing system begins a search for matching geo-tagged images. For example, a user may upload an image using their cellular telephone to the computing system and request their location to be identified by any of the methods described above. Ten minutes later, the computing system may receive another image uploaded from the same cellular telephone requesting another location identification. Rather than beginning a search for matching geo-tagged images in the entire database, the computing system may begin searching for matching images according to the last location identified, i.e., the first uploaded image.

In some embodiments of the methods described above, directional inferences can be made according to certain image characteristics or features. As an example, consider a user walking along a street in downtown Chicago early in the morning, who snaps an image of a building for location identification according to the methods described herein. The right side (from the perspective of the user) of a building may have one of its sides brightly illuminated by the sun, i.e., the image shows one bright side and one or more darker sides of the building. The image analyzer may detect this difference and infer that the user is standing to south of the building because the sun is illuminating the building from the East. In other words, this embodiment may take certain variables into account when performing an image analysis, including the time of day an image was captured as well as shadows and local lighting differences to infer the position of a user relative to the image subject.

Figure 5:
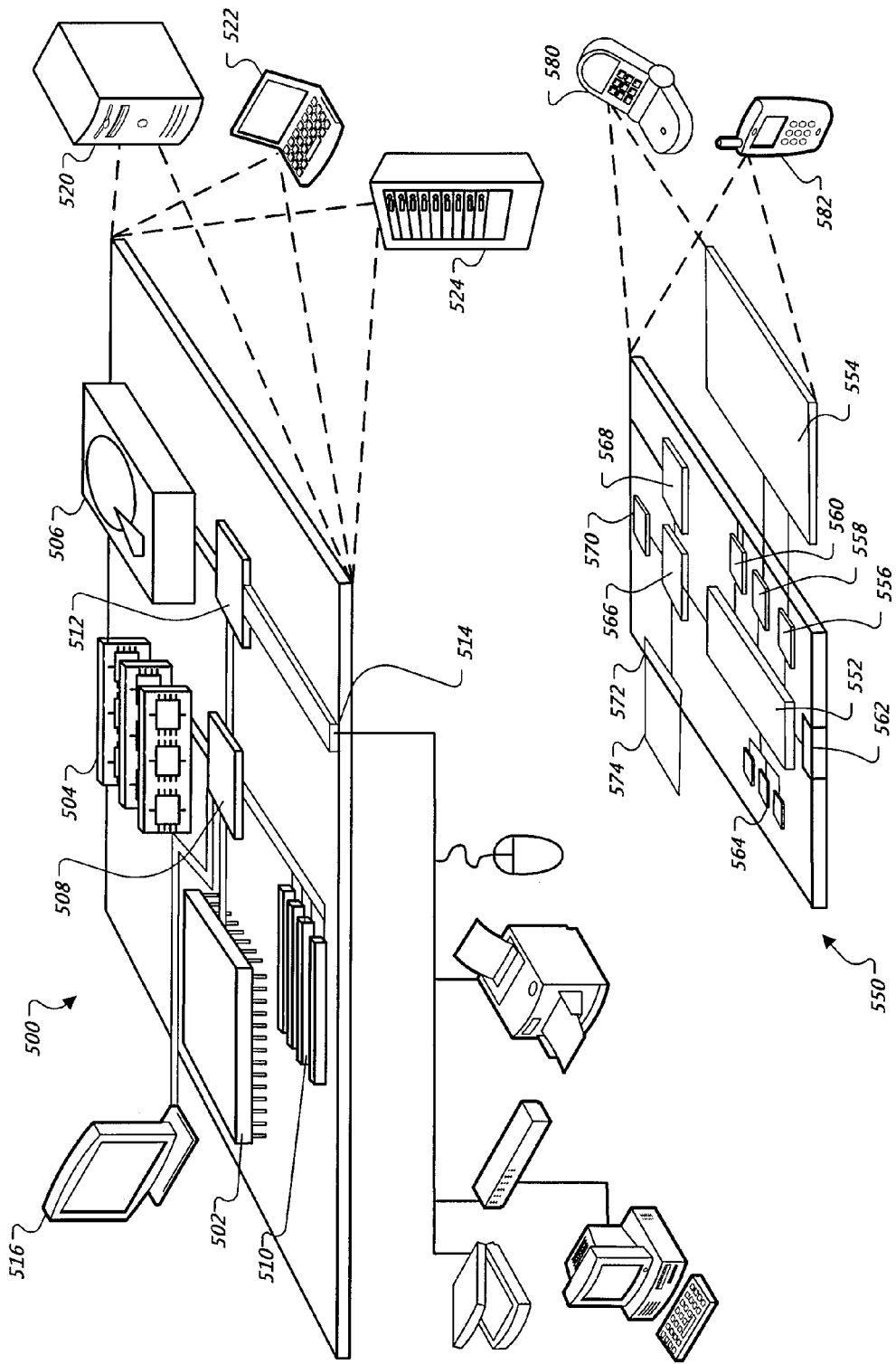
FIG. 5 is a block diagram of computing devices that may be used to implement the systems and methods described in this document.

FIG. 5 is a block diagram of computing devices 500, 550 that may be used to implement the systems and methods described in this document, either as a client, as a server, or as a plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. For example, the stored geo-tagged images may be captured by terrestrial-based photography methods as well as air- or space-based photography methods, including satellite imagery.

In general, information can be served to a user who has uploaded an image for location analysis. The information can include stored regional information, as has been described above, and it can also include "live" information. Examples of live information include webcasts, news events, breaking news, and the like. Such information can be found on, for example, websites, such as CNN (www.cnn.com), or may be collected from third-party sources.

In some embodiments, pertinent information can be served to the user that may affect the user's safety or well-being. For example, a user may submit a location query and the server may determine that they are in an area where a breaking news event is occurring. The information relating to the breaking news event can be sent as an alert to the user (with their location) to inform them of the event. For example, the alert may inform the user that a riot is occurring two blocks north of their current location, and that an immediate evacuation is advised. In another example, a user may have their location identified in a foreign country where heightened violence is expected, and an alert may be sent to them advising to relocate to their nearest embassy.

Of course, breaking news need not be restricted to violent or despondent events. A more "uplifting" alert may inform a user them that a panda bear was just born at a zoo only three blocks from their location, or that a celebrity is signing autographs at a nearby store.

Sources of news information can be retrieved and correlated with a user's location at the national, state, and local level, then sent to the user along with the location information they requested.

Accordingly, other embodiments are within the scope of the following claims.

What is claimed is:

1. A computer-implemented method comprising:
    receiving, at a computer server system, an image from a remote electronic device;
    comparing, with the computer sever system information from the received image with corresponding information from a plurality of stored images, the comparison comprising:
        (a) calculating a level of difference between a first set of feature points in the received image and a second set of feature points in the plurality of stored images; and
        (b) identifying at least one image within the plurality of stored images that satisfies a threshold level of difference between the first set of feature points and the second set of feature points;
    extracting, with the computer server system, location information from the at least one identified image to determine location information to associate with the received image;
    detecting a difference in illumination of an object in the received image and, based on the difference and a time of day the image was captured, inferring a user position relative to the object; and
    transmitting, from the computer server system to the remote device, information identifying a geographic location, the information identifying the geographic location based on the extracted location information and the inferred user position.

2. The method of claim 1, wherein the compared information from the images comprises information from multiple sets of feature points in the images.

3. The method of claim 1, further comprising transmitting a prompt requesting a user to submit information on a name of a roadway or other textual geographic description, and using resulting supplied information to identify location-related information for the received image.

4. The method of claim 1, further comprising generating a match quality indicator for a match between the received image and a stored image, and assigning location information from the stored image to the received image if the quality indicator exceeds a determined level.

5. The method of claim 1, further comprising using information about the remote device location from a source other than the remote device to determine the location for the received image.

6. The method of claim 1, further comprising transmitting to the remote device information relating to events occurring near the identified location.

7. The method of claim 1, further comprising analyzing image characteristics within the received image to determine a user position relative to a subject depicted in the received image.

8. The method of claim 7, wherein the user position is represented by a facing direction of said user relative to the subject depicted in the received image.

9. The method of claim 7, wherein the user position is represented by a proximate distance indicator to a specific geographical location depicted in the received image.

10. A system comprising:
   one or more computers and one or more storage devices storing instructions that are operable, when executed by the one or more computers, to cause the one or more computers to perform operations comprising:
      receiving, at a computer server system, an image from a remote electronic device;
      comparing, with the computer server system, information from the received image with corresponding information from a plurality of stored images, the comparison including:
         (a) calculating a level of difference between a first set of feature points in the received image and a second set of feature points in the plurality of stored images; and
         (b) identifying at least one image within the plurality of stored images that satisfies a threshold level of difference between the first set of feature points and the second set of feature points;
      extracting, with the computer server system, location information from the at least one identified image to determine location information to associate with the received image;
      detecting a difference in illumination of an object in the received image and, based on the difference and a time of day the image was captured, inferring a user position relative to the object; and
      transmitting, from the computer server system to the remote device, information identifying a geographic location, the information identifying the geographic location based on the extracted location information and the inferred user position.

11. The system of claim 10, wherein the one or more computers automatically return local search results for the identified geographic locations.

12. The system of claim 10, wherein the one or more computers automatically provide business information pertaining to the geographically-associated items.

13. A computer-readable medium having instructions encoded thereon, which, when executed by a processor, cause the processor to perform operations comprising:
   receiving, at a computer server system, an image from a remote electronic device;
   comparing, with the computer server system, information from the received image with corresponding information from a plurality of stored images, the comparison comprising:
      (a) calculating a level of difference between a first set of feature points in the received image and a second set of feature points in the plurality of stored images; and
      (b) identifying at least one image within the plurality of stored images that satisfies a threshold level of difference between the first set of feature points and the second set of feature points;
   extracting, with the computer server system, location information from the at least one identified image to determine location information to associate with the received image;
   detecting a difference in illumination of an object in the received image and, based on the difference and a time of day the image was captured, inferring a user position relative to the object; and
   transmitting, from the computer server system to the remote device, information identifying a geographic location, the information identifying the geographic location based on the extracted location information and the inferred user position.

14. The medium of claim 13, wherein the compared information from the images comprises information from multiple sets of feature points in the images.

15. The medium of claim 13, wherein the operations further comprise transmitting a prompt requesting a user to submit information on a name of a roadway or other textual geographic description, and using resulting supplied information to identify location-related information for the received image.

16. The medium of claim 13, wherein the operations further comprise transmitting to the remote device data for displaying a map with the location for the received image marked on the map.

17. The medium of claim 13, wherein the operations further comprise receiving a series of images in a video and comparing a plurality of images in the series to stored images to determine a geographic location corresponding to the received images.

18. The medium of claim 13, wherein the operations further comprise generating a match quality indicator for a match between the received image and a stored image, and assigning location information from the stored image to the received image if the quality indicator exceeds a determined level.

19. The medium of claim 13, wherein the operations further comprise using information about the remote device location from a source other than the remote device to determine the location for the received image.

20. The medium of claim 13, wherein the operations further comprise transmitting to the remote device information relating to events occurring near the identified location.

* * * * *

UNITED STATES PATENT AND TRADEMARK OFFICE
CERTIFICATE OF CORRECTION

PATENT NO. : 8,131,118 B1
APPLICATION NO. : 12/023763
DATED : March 6, 2012
INVENTOR(S) : Yushi Jing and Jian Yuan It is certified that error appears in the above-identified patent and that said Letters Patent is hereby corrected as shown below:

First Page, Item 56, Column 2, Line 3, delete "http:research.microsoft.com" and insert -- http://research.microsoft.com --, therefor.

Column 20, Line 17 (Claim 1), delete "sever" and insert -- server --, therefor.

Signed and Sealed this
First Day of May, 2012

David J. Kappos
*Director of the United States Patent and Trademark Office*